United States Patent [19]

Gaiser

[11] 4,205,883
[45] Jun. 3, 1980

[54] INERTIA SENSING BRAKE PROPORTIONING VALVE

[75] Inventor: Robert F. Gaiser, Stevensville, Mich.

[73] Assignee: The Bendix Corporation, Southfield, Mich.

[21] Appl. No.: 947,677

[22] Filed: Oct. 2, 1978

[51] Int. Cl.$^2$ .............................................. B60T 8/16
[52] U.S. Cl. ................................ 303/24 F; 188/349; 303/6 C; 303/24 C
[58] Field of Search .................... 303/24, 6 C, 23; 188/349

[56] References Cited

U.S. PATENT DOCUMENTS

| 3,377,108 | 4/1968 | Eddy | 303/6 C |
| 3,954,307 | 5/1976 | Young | 303/6 C X |
| 3,966,268 | 6/1976 | Orzel et al. | 303/24 F |
| 3,980,343 | 9/1976 | Stelzer | 303/24 C X |

Primary Examiner—Douglas C. Butler
Attorney, Agent, or Firm—Paul David Schoenle; Ken C. Decker

[57] ABSTRACT

A proportioning valve in a master cylinder is pressure responsive to control the flow of fluid to a wheel cylinder. An inertia sensing member is responsive to the deceleration of a vehicle and is operatively connected to the proportioning valve to control the operation thereof. The inertia sensing member defines a neutral position relative to a housing supporting the proportioning valve. During braking the inertia sensing member generates a force biasing the inertia sensing member toward the proportioning valve, but remains in the neutral position to oppose actuation of the proportioning valve. The proportioning valve includes a sleeve and a pilot which extends through the sleeve to engage the inertia sensing member.

7 Claims, 1 Drawing Figure

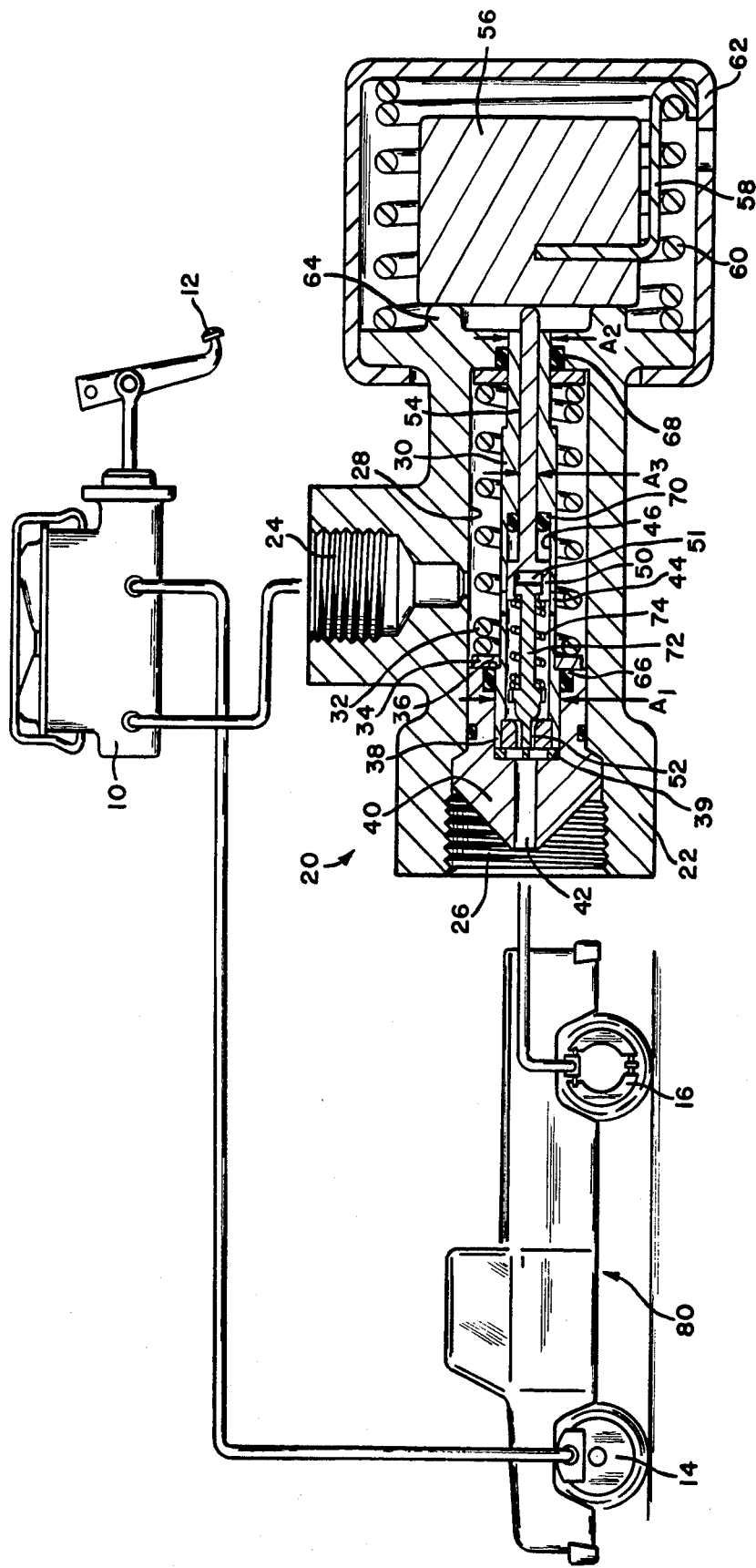

INERTIA SENSING BRAKE PROPORTIONING VALVE

BACKGROUND OF THE INVENTION

During a braking application for a vehicle, the body of the vehicle tilts to shift a major portion of the weight of the vehicle to the front wheels. Therefore, the traction of the rear wheel is reduced so that if equal pressures are communicated to the front and rear wheels, the rear wheels will skid or lock up to create an unsafe driving condition. In order to prevent lockup for the rear wheels the prior art provides a proportioning valve to restrict communication of pressurized fluid to the rear wheels in response to increasing brake fluid pressure.

Moreover, the prior art provides an inertia sensing mass which generates a force in response to vehicle deceleration. The force of the inertia sensing mass is transmitted to the proportioning valve to modify the restriction of pressurized fluid to the rear wheels. The inertia sensing mass is provided to account for the loaded condition of the vehicle, as a loaded vehicle will experience less deceleration than an unloaded vehicle, given one level of pressurized brake fluid.

In prior art inertia sensing proportioning valves, the inertia sensing mass is generally disposed within the fluid path connecting the master cylinder with the wheel cylinder, or movable to impart positive movement to the proportioning valve assembly. Consequently, the inertia sensing mass is subjected to changes in the fluid flow, temperature and viscosity of the brake fluid.

SUMMARY OF THE INVENTION

The present invention relates to an improved inertia sensing proportioning valve for a vehicle. A proportioning valve includes a housing with an inlet communicating with a master cylinder and an outlet communicating with a wheel cylinder of a rear brake assembly. A bore within the housing receives a sleeve and a bore within the sleeve receives a pilot. The inlet and outlet open to the bores and the sleeve is biased to a first position within the bore. Pressurized fluid communicated to the bore of the sleeve biases the pilot to a first position in abutment with an inertia sensing mass resiliently supported relative to the housing and remotely disposed to the housing and sleeve bores. The inertia sensing mass is biased into engagement with the housing by the resilient support.

During a braking application for the vehicle the fluid pressure communicated to the inlet and bores is increased to increase the force acting against the pilot to bias the latter toward the inertia sensing mass. However, the increased fluid pressure is communicated to the brake assembly to cause deceleration of the vehicle, thereby generating a force for the inertia sensing mass in the direction of vehicle travel or toward the pilot. If the vehicle is unloaded, the force of the inertia sensing mass will always be greater than the force acting on the pilot so that the pilot and inertia sensing mass remain stationary during a braking application. In addition, the sleeve is movable relative to the stationary pilot to align an opening in the sleeve with the pilot to vary or restrict fluid communication through the opening and, in turn, to the outlet and brake assembly.

If the vehicle is loaded and the same braking pressure is applied as above, pressure in the sleeve bore will bias the pilot toward the inertia sensing mass. Deceleration of the vehicle is reduced due to a heavier load on the vehicle and higher kinetic energy, which is to be arrested or diminished during braking, is created. Consequently, the inertia sensing mass generates a force in the direction of the pilot, albeit less than for an unloaded vehicle and also less than the force biasing the pilot toward the inertia sensing mass. As a result, the pilot is biased toward the inertia sensing mass to cause the pilot and inertia sensing mass to move in a direction opposite the force generated by the inertia sensing mass. As a result, it takes a higher level of increased braking fluid pressure within the housing bore before the sleeve opening will be aligned with the pilot to vary fluid communication to the rear brake assembly. The delay in proportioning fluid communication to the rear brake assembly of a loaded vehicle is desired as the increased kinetic energy of the loaded vehicle requires a greater braking effort to arrest or stop the loaded vehicle.

It is an object of the present invention to provide an inertia sensing mass which does not impart positive movement to a proportioning valve assembly but instead acts as a stop or abutment to limit movement of a portion of the proportioning valve assembly.

It is another object of the present invention to directly engage the inertia sensing mass with the proportioning valve assembly and also dispose the inertia sensing mass remote from the fluid path communicating the master cylinder with the rear brake assembly.

It is a further object of the present invention to resiliently bias and support the inertia sensing mass relative to a housing of a proportioning valve such that frictional resistance to movement of the inertia sensing mass in response to deceleration of the vehicle is substantially eliminated.

BRIEF DESCRIPTION OF THE DRAWING

The sole FIGURE is a schematic illustration of a brake system showing an inertia sensing proportioning valve in cross section.

DETAILED DESCRIPTION

A fluid pressure generator 10, such as a master cylinder, is operable by a vehicle operator upon movement of pedal 12 to communicate pressurized fluid to a front brake assembly 14 and a rear brake assembly 16. The front and rear brake assemblies include hydraulic actuators which are pressure responsive to actuate braking. An inertia sensing proportioning valve 20 is disposed within the fluid path between the master cylinder 10 and the rear brake assembly 16.

A housing 22 defines an inlet 24 communicating with the master cylinder and an outlet 26 communicating with the hydraulic actuator for the rear brake assembly 16. A stepped bore 28 within the housing opens to the inlet 24 and outlet 26 and movably receives a sleeve 30. A spring 32 and ring 34 cooperate with a shoulder 36 on the sleeve 30 to bias the latter to a first position where one end 38 of the sleeve is engageable with a plug 40 having a port 42 opening to the outlet 26. The plug carries a ring 39 abutting the sleeve and 38. Apertures at 44 on the sleeve 30 lead to a stepped bore 46 in the sleeve 30 and a pilot 50 is disposed within the sleeve bore 46. One end of the pilot 50 cooperates with a variable orifice 52 at the one end of the sleeve 30 to vary the opening of the variable orifice 52 in a manner hereinafter described.

In accordance with the invention, the other end of the pilot 50 is received within a portion 54 of sleeve bore 46 to extend outwardly of the housing 22 and engage an inertia sensing mass or member 56. The inertia sensing mass 56 is resiliently supported by a leaf spring 58 and a coil spring 60. The mass 56, leaf spring 58 and coil spring 60 are disposed within a removable cap or cover 62 which is attached to the housing 22. The leaf spring 58 biases the mass into engagement with at least one stop 64 projecting from the housing 22 to define a first position for the pilot 50 when the latter is engaged with the mass 56. The inertia sensing mass 56 is responsive to deceleration or acceleration to generate a force in a direction opposite to the direction of acceleration.

A seal 66 defines a first area $A_1$ for the sleeve 30 and a seal 68 defines a second area $A_2$ for the sleeve while a seal 70 defines a third area $A_3$ for the pilot 50. The pilot 50 includes a tip 72 biased by spring 74 against ring 39 to an extended position to provide for slight withdrawal of the tip 72 into a pilot cavity 51 should the tip engage the one end of the sleeve 30.

MODE OF OPERATION

The inertia sensing proportioning valve is horizontally positioned with respect to the sleeve bore axis within a vehicle 80 such that the inertia sensing mass 56 is disposed toward the rear of the vehicle and the housing 22 is disposed toward the front of the vehicle. During a brake application for the vehicle in an unloaded condition, the master cylinder 10 generates fluid pressure which is communicated to the front brake assembly 14 and also to the rear brake assembly 16 via the inertia sensing proportioning valve. Pressurized fluid within the front and rear brake assemblies causes the vehicle to decelerate.

Pressurized fluid entering the inlet 24 is communicated to the stepped bore 28, through the aperture 44 to the stepped bore 46 and out the variable orifice 52 to communicate with the rear brake assembly 16 via outlet 26. Pressurized fluid within the stepped bore 28 acts against the area $A_1$ of sleeve 30 both upstream of sleeve bore 46 and downstream of sleeve orifice 52 so that the forces across sleeve area $A_1$ are substantially canceled out. However, the sleeve area $A_2$ is subjected to the pressurized fluid within stepped bore 28 to generate a force on the sleeve biasing the latter against the spring 32. So long as the force of the spring 32 is larger than the resulting force on the sleeve 30 the pressure at the inlet 24 will be equal to the pressure at the outlet 26. Moreover, the pressurized fluid within the sleeve stepped bore 46 acts against the area $A_3$ of the pilot 50 to bias the latter toward the inertia sensing mass 56. Consequently, with the spring force being larger than the resulting force on the sleeve, the sleeve remains in the position illustrated. Pressurized fluid at the outlet 26 causes the vehicle 80 to decelerate so that the inertia sensing mass 56 generates a force toward the pilot 50 to oppose the force across the area $A_3$ on the pilot created by pressurized fluid within sleeve stepped bore 46.

The spring 32 cooperates with the sleeve area $A_2$ to define a predetermined pressure level. Below the predetermined pressure level, pressurized fluid within the stepped bore 28 acting against area $A_2$ is less than the force created by the spring 32 and above the predetermined pressure level, the pressurized fluid acting against the sleeve area $A_2$ is sufficient to overcome the force of spring 32. If the braking effort at the pedal 12 is increased and the fluid pressure generated by the master cylinder is above the predetermined pressure level, the increased pressure is communicated to the stepped bore 28 to act against the sleeve area $A_2$ to contract the spring 32. The sleeve moves toward the mass 56 to align the variable orifice 52 with an enlarged portion of the pilot tip 72, thereby restricting fluid communication to the rear brake assembly.

When the vehicle is unloaded during a brake application, the deceleration of the vehicle is transmitted to the mass 56 to generate a force in the direction of the front of the vehicle. Moreover, increasing fluid pressures during braking are communicated to the stepped bore 46 to increasingly bias the pilot 50 toward the mass; however, the increasing fluid pressures also increase deceleration to correspondingly increase the force generated by the mass to more than offset the pressure applied against the pilot 50. Consequently, the pilot and mass remain stationary during a brake application for the unloaded vehicle, even if braking pressure exceeds the predetermined level where proportioning or restriction to the rear brake assembly is occurring.

If the vehicle is loaded, increasing brake pressure within the stepped bore 46 will not be accompanied by a corresponding increase in deceleration for the vehicle as the load on the vehicle creates additional kinetic energy which prevents deceleration at the same rate when the vehicle is unloaded. Therefore, the force of the increasing pressurized fluid acting against area $A_3$ of the pilot will be greater than the force generated by the mass 56 so that the pilot and mass will be movable to the right, viewing the figure. As a result, the enlarged portion of the pilot tip 72 will be moved to the right so that the sleeve will have to travel a greater distance to the right to align the enlarged portion with the variable orifice 52, than when the pilot remains stationary in the unloaded condition of the vehicle. In the loaded condition of the vehicle the pressurized fluid communicated to the stepped bore 28 will be greater than in the unloaded condition before the sleeve cooperates with the pilot to restrict fluid communication, as the sleeve must further contact the spring 32 to align the variable orifice with the enlarged portion of the tip 72 when the vehicle is loaded. Consequently, the predetermined pressure level at which the sleeve cooperates with the pilot to restrict fluid communication to the rear brake assembly will be increased when the vehicle is loaded in comparison to the predetermined pressure level when the vehicle is unloaded. In other words, the proportioning of fluid to the rear brake assembly is delayed when the vehicle is loaded as the force generated by the mass is insufficient to retain the pilot in the stationary or first position.

In order to isolate the mass from the pressurized fluid, the mass is disposed outside the housing and is biased to a position engaging the housing stop 64. Deceleration of the vehicle generates a force for the mass in the direction of the pilot; however, the mass does not pivot or move in response to vehicle deceleration. The only time the mass moves is when the fluid pressure acting on the pilot at $A_3$ is sufficient to overcome the force generated by the mass during decleration and this only occurs when the vehicle is loaded.

I claim:
1. In a brake system for a vehicle, a master cylinder operable to generate fluid pressure during a brake application, a wheel cylinder responsive to the fluid pressure generated by the master cylinder to effect braking, a valve assembly providing fluid communication between the master cylinder and the wheel cylinder, the valve assembly being movable in response to the fluid pressure generated by the master cylinder from a first position to a second position to vary fluid communication to the wheel cylinder, and a member engageable with the valve assembly, the member being responsive to a deceleration of the vehicle to generate a force, the improvement wherein the direction of the force generated by the member is toward the valve assembly, the force cooperating with the valve assembly to oppose movement of the latter, the valve assembly comprising a sleeve member having a bore therein and a pilot member disposed within said sleeve member bore, said pilot member being engageable with the force generating member to define a rest position, and said force generating member being responsive to the deceleration of the vehicle to maintain said pilot member and said force generating member in the rest position.

2. In a proportioning valve for a vehicle having an inlet communicating with a fluid pressure source and an outlet communicating with a brake assembly, a pressure responsive assembly cooperating with the inlet and the outlet to vary fluid communication therebetween in response to pressurized fluid communicated to the inlet, and an inertia sensing mass responsive to deceleration of the vehicle and cooperating with the pressure responsive assembly to bias the latter to a position varying fluid communication between the inlet and the outlet, the improvement wherein the inertia sensing mass is resiliently disposed in a neutral position relative to the pressure responsive assembly, the inertia sensing mass being responsive to the deceleration of the vehicle to generate a force opposing the pressure responsive assembly and the inertia sensing mass remaining substantially in said neutral position during deceleration of the vehicle.

3. The proportioning valve of claim 2 in which the vehicle includes a loaded and an unloaded condition, the pressure responsive assembly cooperating with the inertia sensing mass during the deceleration of the vehicle to move the inertia sensing mass away from said neutral position in a direction opposite the force generated thereby when the vehicle is in a loaded condition and the inertia sensing mass substantially remaining in said neutral position when the vehicle is in an unloaded condition.

4. A proportioning valve comprising:
a housing having an inlet communicating with an outlet, the inlet being adapted for receiving pressurized fluid from a fluid pressure source and the outlet being adapted for communicating pressurized fluid to a brake assembly;
a pressure responsive assembly movably disposed within said housing, said pressure responsive assembly being operable in response to the pressurized fluid communicated to the inlet to vary fluid communication between the inlet and the outlet; and
an inertia sensing mass resiliently biased into engagement with said housing to substantially define a neutral position, said inertia sensing mass generating a force in the direction of said pressure responsive assembly when the fluid pressure communicated to the inlet is increased, said force acting to oppose movement of said pressure responsive assembly and said inertia sensing mass remaining in said neutral position when said force is generated.

5. The proportioning valve of claim 4 in which said housing defines a stop and said inertia sensing mass is engageable with said stop in said neutral position.

6. In a proportioning valve for a vehicle, a housing substantially defining an inlet communicating with a fluid pressure source and an outlet communicating with a brake assembly, a passage within the housing communicating the inlet with the outlet and receiving a sleeve, the sleeve forming a portion of the passage communicating the inlet with the outlet and being resiliently biased to a first position, a pilot member carried by the sleeve and cooperating therewith to form an orifice between the inlet and the outlet, the sleeve being movable relative to the pilot member to vary fluid communication through the variable orifice, the pilot member being pressure responsive to the fluid pressure generated by the fluid pressure source so as to be biased to a stationary first position, an inertia sensing mass engageable with the pilot member to substantially define the stationary first position of the pilot member, the inertia sensing mass generating a force in the direction of deceleration of the vehicle and the vehicle having a loaded and an unloaded condition, the improvement wherein the inertia sensing mass generates a force greater than the bias of the fluid pressure on the pilot member when the vehicle is decelerating in the unloaded condition so as to retain the pilot member and the inertia sensing mass in the stationary first position and the bias created by the fluid pressure on the pilot member is greater than the force generated by the inertia sensing mass when the vehicle is decelerating in the loaded condition so as to move the pilot member and the inertia sensing mass in a direction opposite the direction of the force generated by the inertia sensing mass to delay the variation of fluid communication through the variable orifice.

7. The proportioning valve of claim 6 in which the first position of the pilot member is substantially defined by the inertia sensing mass when the latter is positioned in abutment with the housing.

* * * * *